United States Patent
Frey et al.

(10) Patent No.: US 9,694,740 B2
(45) Date of Patent: Jul. 4, 2017

(54) METHOD OF MAKING A WINDOW COMPRISING A LIQUID-CRYSTAL INCLUSIVE SWITCHABLE FILM THAT IS OPERABLE IN AT LEAST FIRST AND SECOND VISIBLE TRANSMISSION MODES

(71) Applicant: Guardian Industries Corp., Auburn Hills, MI (US)

(72) Inventors: Timothy J. Frey, Syracuse, IN (US); Robert A. Vandal, Syracuse, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 15/356,961

(22) Filed: Nov. 21, 2016

(65) Prior Publication Data

US 2017/0072847 A1   Mar. 16, 2017

Related U.S. Application Data

(62) Division of application No. 14/466,217, filed on Aug. 22, 2014, now Pat. No. 9,517,721.

(51) Int. Cl.
*B60Q 1/26* (2006.01)
*G02F 1/1334* (2006.01)
(Continued)

(52) U.S. Cl.
CPC .......... *B60Q 3/0213* (2013.01); *B60Q 1/2696* (2013.01); *G02F 1/1334* (2013.01); *G02F 2001/133302* (2013.01)

(58) Field of Classification Search
CPC .. B60Q 3/0203; B60Q 1/2661; B60Q 3/0213; B60Q 1/268; B32B 17/10541;
(Continued)

(56) References Cited

U.S. PATENT DOCUMENTS 3,317,906 A    5/1967  Baldrige
4,532,181 A    7/1985  Brill et al.
(Continued)

FOREIGN PATENT DOCUMENTS

DE    10 2012 109 900 A1    4/2014
WO    WO 2007/077239         7/2007
WO       2009/061329         5/2009

OTHER PUBLICATIONS

U.S. Appl. No. 14/466,217, filed Aug. 22, 2014; Frey et al.
(Continued)

*Primary Examiner* — Paul Lee
(74) *Attorney, Agent, or Firm* — Nixon & Vanderhye P.C.

(57) ABSTRACT

Certain example embodiments relate to a vehicle window (e.g., sunroof). Side-firing LEDs are provided between first and second substantially parallel substrates and emit light towards central regions of the window. A liquid-crystal inclusive switchable film is provided between the first and second substrates. The liquid crystals are sized such that light received from the LEDs is redirected in a direction substantially normal to major surfaces of the first and second substrates. The switchable film is operable in at least first and second modes, with the window in the first mode having a visible transmission of less than 1%, and with the window in the second mode having a visible transmission of 7-15%. The switchable film and the LEDs are operable independently of one another in connection with the LEDs emitting light and the switchable film controlling visible transmission therethrough.

1 Claim, 5 Drawing Sheets

(51) Int. Cl.
*G02F 1/1333* (2006.01)
*B60Q 3/02* (2006.01)

(58) Field of Classification Search
CPC .. B32B 17/10504; B32B 2367/00; B60J 3/04; G02F 1/1313; G02F 1/132; G02F 1/1334; G02F 1/13718
See application file for complete search history.

(56) References Cited

U.S. PATENT DOCUMENTS

| | | | |
|---|---|---|---|
| 4,806,221 A | 2/1989 | Gillery | |
| 4,883,721 A | 11/1989 | Nalepka et al. | |
| 4,965,093 A | 10/1990 | Neuman et al. | |
| 5,178,966 A | 1/1993 | Gillery | |
| 5,251,048 A | 10/1993 | Doane et al. | |
| 5,384,067 A | 1/1995 | Doane et al. | |
| 5,409,744 A | 4/1995 | Gotoh et al. | |
| 5,437,811 A | 8/1995 | Doane et al. | |
| 5,453,863 A | 9/1995 | West et al. | |
| 5,539,552 A | 7/1996 | Desai et al. | |
| 5,584,902 A | 12/1996 | Hartig et al. | |
| 5,621,552 A | 4/1997 | Coates et al. | |
| 5,668,614 A | 9/1997 | Chien et al. | |
| 5,691,795 A | 11/1997 | Doane et al. | |
| 5,695,682 A | 12/1997 | Doane et al. | |
| 5,748,277 A | 5/1998 | Huang et al. | |
| 5,837,361 A | 11/1998 | Glaser et al. | |
| 5,847,798 A | 12/1998 | Yang et al. | |
| 5,877,826 A | 3/1999 | Yang et al. | |
| 5,932,502 A | 8/1999 | Longobardo et al. | |
| 6,001,487 A | 12/1999 | Ladang et al. | |
| 6,039,390 A | 3/2000 | Agrawal et al. | |
| 6,061,107 A | 5/2000 | Yang et al. | |
| 6,104,448 A | 8/2000 | Doane et al. | |
| 6,154,190 A | 11/2000 | Yang et al. | |
| 6,160,655 A | 12/2000 | Fix et al. | |
| 6,204,835 B1 | 3/2001 | Yang et al. | |
| 6,268,839 B1 | 7/2001 | Yang et al. | |
| 6,270,236 B1 | 8/2001 | Brussog | |
| 6,320,563 B1 | 11/2001 | Yang et al. | |
| 6,466,298 B1 | 10/2002 | Fix et al. | |
| 6,486,928 B1 | 11/2002 | Lin et al. | |
| 6,493,128 B1 | 12/2002 | Agrawal et al. | |
| 6,576,349 B2 | 6/2003 | Lingle et al. | |
| 6,596,399 B2 | 7/2003 | Veerasamy | |
| 6,632,491 B1 | 10/2003 | Thomsen et al. | |
| 6,672,108 B2 | 1/2004 | Landa et al. | |
| 6,674,504 B1 | 1/2004 | Li et al. | |
| 6,746,775 B1 | 6/2004 | Boire et al. | |
| 6,887,575 B2 | 5/2005 | Neuman et al. | |
| 6,927,186 B2 | 8/2005 | Hulme et al. | |
| 6,988,339 B2 | 1/2006 | Pylkki et al. | |
| 7,056,588 B2 | 6/2006 | Neuman et al. | |
| 7,189,458 B2 | 3/2007 | Ferreira et al. | |
| 7,198,851 B2 | 4/2007 | Lemmer et al. | |
| 7,218,450 B2 | 5/2007 | Ahn et al. | |
| 7,220,793 B2 | 5/2007 | Vanier et al. | |
| 7,236,151 B2 | 6/2007 | Doane et al. | |
| 7,325,417 B2 | 2/2008 | Landa et al. | |
| 7,479,940 B2 | 1/2009 | Marhefka | |
| 7,712,933 B2 | 5/2010 | Fleischmann et al. | |
| 7,771,830 B2 | 8/2010 | Neuman et al. | |
| 7,862,220 B2 | 1/2011 | Cannon et al. | |
| 7,998,320 B2 | 8/2011 | Laird et al. | |
| 8,613,977 B2 | 12/2013 | Mikamo et al. | |
| 8,956,548 B2 | 2/2015 | Clapp et al. | |
| 9,517,721 B2 | 12/2016 | Frey et al. | |
| 2003/0150711 A1 | 8/2003 | Laird | |
| 2004/0160538 A1 | 8/2004 | Li et al. | |
| 2005/164015 A1 | 7/2005 | Laird et al. | |
| 2006/0023146 A1 | 2/2006 | Yang et al. | |
| 2006/0029815 A1 | 2/2006 | Woodruff et al. | |
| 2006/0262260 A1 | 11/2006 | Majumdar et al. | |
| 2009/0115922 A1 | 5/2009 | Veerasamy | |
| 2009/0135319 A1* | 5/2009 | Veerasamy | G02F 1/1334 349/16 |
| 2013/0038093 A1* | 2/2013 | Snider | B62D 25/06 296/219 |
| 2013/0214562 A1* | 8/2013 | Uehara | B60J 3/04 296/215 |
| 2014/0176836 A1 | 6/2014 | Brecht et al. | |

OTHER PUBLICATIONS

International Search Report mailed Oct. 26, 2015 for PCT/US2015/046210.

U.S. Appl. No. 13/826,495, filed Mar. 14, 2013, Hatwar et al.

* cited by examiner

METHOD OF MAKING A WINDOW COMPRISING A LIQUID-CRYSTAL INCLUSIVE SWITCHABLE FILM THAT IS OPERABLE IN AT LEAST FIRST AND SECOND VISIBLE TRANSMISSION MODES

This application is a division of application Ser. No. 14/466,217, filed Aug. 22, 2014, the entire disclosure of which is hereby incorporated herein by reference in this application.

FIELD OF THE INVENTION

Certain example embodiments of this invention relate to vehicle sunroofs with switchable glazings and side-firing light emitting diodes (LEDs), and/or methods of making the same. More particularly, certain example embodiments of this invention relate to vehicle sunroofs with switchable glazings that help guide light from side-firing LEDs so that such light is redirected into and helps illuminate the vehicles' cabins (e.g., for dome light type applications), and/or methods of making the same. Certain example embodiments alternatively or additionally may include direct- or downward-firing LEDs for these and/or other applications.

BACKGROUND AND SUMMARY OF EXAMPLE EMBODIMENTS OF THE INVENTION

Retractable and/or tilting sunroofs oftentimes are available as options on certain trucks and automobiles. Such sunroofs oftentimes are heavily tinted and/or otherwise have a low visible transmission, e.g., to block light from the sun and/or other overhead light sources from entering into the vehicles' cabins. Although the generally low visible transmission through sunroofs also helps hide vehicle interiors from "prying eyes," retractable privacy shades also are generally included in vehicles equipped with sunroofs. These privacy shades help further block light from the sun and/or other overhead light sources from entering into the vehicles' cabins.

The inclusion of sunroof privacy shades in vehicles, although helpful in the above-identified and/or other respects, unfortunately reduces the headroom available in such vehicles cabins. Furthermore, the presence of a sunroof itself sometimes presents difficulties when it comes to deciding where to locate an overhead cabin dome light or the like. That is, interior cabin lighting features generally cannot be provided on or below sunroofs, because the sunroofs retract and/or tilt. Similarly, interior cabin lighting features generally cannot be provided on or below privacy shades, as they too retract. Thus, lighting elements may be moved far forward, far backward, to the sides, and/or the like. And as vehicle sunroofs become much larger and often include multiple sections, challenges arise with respect to the ability to package mechanical shades, and the need for such mechanical shades can actually become a barrier to having larger sunroof areas. Sometimes, multiple lighting elements are provided so that more of the cabin can be illuminated, when desired.

Thus, it will be appreciated that it would be desirable to overcome these and/or other challenges. For instance, it will be appreciated that it would be desirable to provide vehicle sunroofs and lighting features that work in concert with one another to provide interesting aesthetics within vehicle cabins.

One aspect of certain example embodiments relates to the combination of a switchable film (e.g., a polymer dispersed liquid crystal (PDLC) film or the like) and a circuit containing light emitting diodes (LEDs) in the same glass lamination. In certain example embodiments, the LEDs are side-firing LEDs that couple with the switchable film and create an ambient light source, whereas the switchable film provides variable transmission through the laminated product. In certain example embodiments, the LEDs and the switchable film may be used independently of one another for different purposes.

Another aspect of certain example embodiments relates to combining embedded LEDs (e.g., side-firing LEDs) and a switchable film into one system that uses the switchable film as a beam-steering element in a laminated product such that light output from the LEDs is redirected. Because the LEDs are in close proximity to the PDLC film, in certain example embodiments light output from the LEDs can be optically coupled into the PDLC film, transmitting it through the cross-section of the film, and causing it to be emitted as dispersed or diffuse light in a direction substantially perpendicular to the light emitted by the side-firing LEDs. In certain example embodiments, the switchable film can be used to redirect and soften harsh LED light or otherwise modulate the transmission of light through a glass system that includes such a switchable film.

Another aspect of certain example embodiments relates to the use of selective dispersive films whose properties are matched to the light emitted from LEDs such that they serve as light dispersive agents suitable for producing useful light in vehicle interior and/or other applications.

In certain example embodiments, a sunroof for a vehicle is provided. First and second glass substrates are substantially parallel to one another. LEDs are provided between the first and second substrates and are configured to emit light towards central regions of the sunroof. A light scattering layer is provided between the first and second substrates, with the light scattering layer having light scatterers disposed therein, and with the light scatterers being sized and arranged in the light scattering layer and relative to the LEDs such that light received from the LEDs is redirected in a direction substantially normal to major surfaces of the first and second substrates.

In certain example embodiments, a window is provided. First and second glass substrates are substantially parallel to one another. LEDs are provided between the first and second substrates and are configured to emit light towards a center of the window. A light scattering layer is provided between the first and second substrates, with the light scattering layer having light scatterers disposed therein, and with the light scatterers being sized and positioned relative to at least the LEDs such that light received from the LEDs is redirected in a direction substantially normal major surfaces of the first and second substrates.

In certain example embodiments, a window is provided. First and second glass substrates are substantially parallel to one another. Side-firing LEDs are provided between the first and second substrates and are configured to emit light towards central regions of the window. A liquid-crystal inclusive switchable film is provided between the first and second substrates, with the liquid crystals of the liquid-crystal inclusive switchable film being sized such that light received from the LEDs is redirected in a direction substantially normal to major surfaces of the first and second substrates. The switchable film is operable in at least first and second modes, with the window in the first mode having a visible transmission of less than 1%, and with the window in the second mode having a visible transmission of 7-15%. The switchable film and the LEDs are operable independently of one another in connection with the LEDs emitting light and the switchable film controlling visible transmission therethrough.

Methods of making the above-described and/or other sunroofs, windows, etc., also are contemplated herein.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
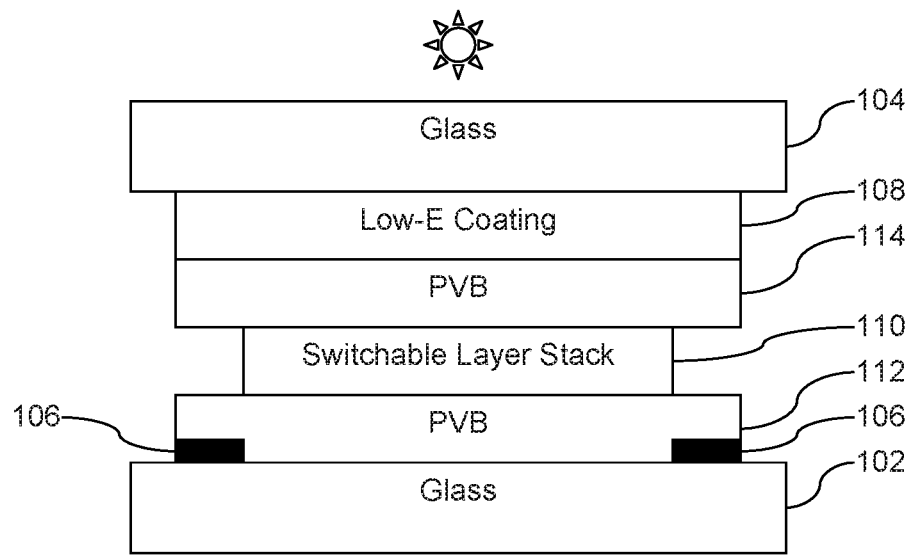
FIG. 1 is a partial cross-sectional view of a sunroof in accordance with certain example embodiments.

Certain example embodiments relate to improvements to vehicle sunroofs. For example, certain example embodiments relate to vehicle sunroofs that include switchable glazings and side-firing light emitting diodes (LEDs), and/or methods of making the same. The sunroofs of certain example embodiments may help reduce the need for, and sometimes completely even eliminate, the need for privacy shades provided in vehicles. Additionally, or in the alternative, the sunroofs of certain example embodiments may help reduce the need for, and sometimes completely even eliminate, the need for separate vehicle cabin lighting elements.

By way of introduction, it is noted that some contemporary switchable glazings are being used in a variety of residential and commercial settings. In this regard, switchable glazings have been used for privacy purposes in a wide variety of environments ranging from office conference rooms to hotel and nightclub restrooms, for example. Some switchable glazings have been used to convey information, e.g., for directional signage, advertising, and/or other purposes. Switchable materials include liquid-crystal inclusive materials such as, for example, polymer-dispersed liquid crystal (PDLC) materials, polymer-aligned liquid crystal (PALC) materials, and/or the like. Electrochromic and/or other materials may be used for switchable purposes, as well.

The assignee has recognized that it is possible to incorporate switchable glazings into sunroof applications. These switchable glazings may be made retractable and/or tilting so that they might serve in this capacity.

The assignee has, however, also noted that some switchable glazings are more effective when it comes to scattering, as compared to completely or mostly blocking, light. Thus, the simple use of a switchable glazing in a sunroof application might not necessarily be sufficient to serve the light blocking functionality of an ordinary sunroof. Moreover, the simple use of a switchable glazing in a sunroof application might not necessarily be sufficient to replace a more conventional privacy shade.

Despite these issues, the assignee has recognized that it is possible to advantageously use the light scattering features of switchable materials in switchable glazings to provide the type of diffuse and/or ambient light that is desired for cabin interiors in connection with cabin lighting functionality, if suitable forms of light are in-coupled to the switchable materials. Even though they generally are viewed as intense, highlight collimated, point light sources, side-firing LEDs and/or the like may be used as sources of light in-coupled to the switchable materials for these ambient, softly lighting and/or other purposes. Moreover, by using privacy glass for at least one substrate in the switchable sunroof glazing, it is possible to enable a low but variable visible transmission suitable for sunroof-type applications. Together with the incorporation of the other materials in the overall switchable sunroof device stack, and optional use of switchable glazing itself, it may in certain example embodiments be sufficient to provide the low visible transmission typical of current sunroofs, e.g., simulating the effects of the privacy shade being open and closed.

Example privacy glass of the type that may be used herein is described in, for example, U.S. Pat. Nos. 7,325,417; 6,927,186; 6,672,108; 5,932,502; and 5,584,902, the entire contents of each of which are hereby incorporated by reference herein. More particularly, the specific glass compositions, methods of making he glass, and/or optical properties, described therein may be used in connection with certain example embodiments. It will be appreciated that the term LED may refer to inorganic or organic LEDs, which may be used in certain example embodiments.

Certain example embodiments use LEDs that are embedded between first and second glass substrates to illuminate part or all of a vehicle's interior space through indirect illumination and optionally though both indirect and direct illumination. The indirect and/or direct illumination may be accomplished using light emitted in shapes that are large areas and/or relatively smaller areas. These smaller areas may be appropriate for artistic details such as, for example, details appropriate for a logo, emblem, and/or the like; to provide information such as via a gauge, warning symbol, and/or other indicia via a purposeful visual aid; etc.

Because the LEDs are embedded within the glass, they advantageously are protected. For instance, the LEDs may be made substantively impervious to most mechanisms that could cause a failure of the lighting system such as, for example, mechanical wear, shocks, etc.; attacks from direct flame, dirt, rain, snow, chemicals, gaseous species; and/or other perturbations that otherwise could attack the lighting system (including, for example, the LEDs themselves, optical element used to collect, direct, and/or disperse the light emitted from the LEDs, the electrical circuitry used to power, monitor, and/or control the lighting system, etc.), etc.

In certain example embodiments, the combination of side-firing LEDs and closely spaced transmissive/dispersive elements, including a PDLC film that can also be used independently of the LEDs to vary the transmission of light through the glass laminate, allows the LEDs to be used as ambient or mood lighting. Example switchable PLDC films suitable for use with certain example embodiments have been available from Citala Films, Polytronix, Scienstry, Smart Films, and other providers, although it will be appreciated that PDLC and/or other switchable films may be obtained from a wide variety of different sources. The LEDs also can be used as effective backlighting through select openings in otherwise opaque areas used to inform the driver and/or passenger(s) of some safety-related or other useful information that can be represented in a visual manner, without the harshness usually associated with point source LEDs.

Although many LED circuits involve top- or bottom-firing LEDs in these sense that the LEDs are mounted to substrate circuits such that light emitted therefrom is emitted normal to the surfaces of the substrates to which the LEDs are attached (e.g., because of the intense point source nature of LEDs), as indicated above, certain example embodiments involve side-firing LEDs where light from the LEDs is emitted perpendicular to the surface of the substrates to which the LEDs are attached. The assignee recognized that if the light were somehow to impinge on a non-absorbing substance that also contained dispersing particles, then the light could be transmitted through a portion of the non-absorbing substance while another portion of the light could be dispersed away from the LED emitting surface. It was further surmised that this light, if it could be redirected normal or substantially normal to the surface of the LEI) substrate after having been transmitted parallel through the non-absorbing substance at least some distance, would be "less harsh" or "softer" than the light emitted from a top-firing LEI) and therefore useful as general ambient lighting within a vehicle, or as a more uniform source of light for being emitted through shaped openings in otherwise coated (e.g., opaque) areas of the glass in the vicinity of the non-absorbing substances, Downward-facing LEDs also could be used for this latter purpose.

It was further recognized that the PDLC used for embedded switchable glass would be an excellent non-absorbing dispersive substance that could serve this purpose. Offset conditions between the LEDs and the side of the PDLC film exist that allow the light emitted from a side-firing LEDs to optically couple into the side of a PDLC film and travel down a substantial distance into the PDLC film, while at the same time allowing a percentage of the light to be emitted in a direction essentially 90 degrees to the emitted direction of the side-firing LED. Thus, a side-firing point source of light in one direction can be converted to an essentially uniformly illuminated "softer" source of light in a direction substantially perpendicular to the original emitted light.

Referring now more particularly to the drawings in which like reference numerals indicate like parts throughout the several views, FIG. 1 is a partial cross-sectional view of a sunroof in accordance with certain example embodiments. The FIG. 1 example sunroof includes first and second glass substrates 102 and 104. As indicated above, the first substrate 102 may comprise darker privacy glass. This may be advantageous in term of its ability to more naturally conceal from the vehicle interior at least some of the control electronics provided above it. The second substrate 104 may be standard soda lime silica glass.

Black frit or paint 106 or the like is provided around a peripheral area of the sunroof, e.g., to help hide electrical components such as, for example, the LEDs and the circuitry that powers, monitors, and/or controls the LEDs and/or the switchable film. The black frit or paint 106 is shown on an inner surface of the first substrate 102 in the FIG. 1 example. It may, however, be provided on the outer surface of the first substrate 102 that is closest the vehicle interior in place of or in addition to, this arrangement. In certain example embodiments, black frit or paint additionally or alternatively may be provided on one or both surfaces of the second substrate 104.

A low-emissivity (low-E) coating 108 is provided on the second surface of the glass substrate. Example low-E coatings are identified, and some discussed in greater detail, below.

The switchable layer stack 110 is sandwiched between the first and second glass substrates 102 and 104. The first and second glass substrates 102 and 104 may be laminated to one another with the switchable layer stack 110 therebetween using any suitable materials such as, for example, PVA, PVB, EVA, PET, PU, and/or the like. Interlayer material may be obtained from any suitable supplier such as, for example, Solutia, Huntsman, Dow Chemicals, and/or the like. In the FIG. 1 example, first and second PVB interlayers 112 and 114 are shown as laminating together the first and second glass substrates 102 and 104 with the switchable layer stack 110 therebetween. Each PVB interlayer in the FIG. 1 example may be provided to any suitable thickness such as, for example, 0.01-0.1 inches, more preferably 0.015-0.030 inches.

The entire stack shown in FIG. 1 may have two different dominant visible transmissions. In a first mode of operation that corresponds to a privacy mode of operation (e.g., a conventional privacy shade being closed), the visible transmission preferably is less than 10%, more preferably less than 7%, more preferably less than 3%, and may be less than or equal to about 0.5% in certain example embodiments. In a second mode of operation that corresponds to a light-transmissive mode (e.g., a conventional privacy shade being open), visible transmission preferably is 3-30%, more preferably 5-20%, and most preferably 7-15%.

Figure 2:
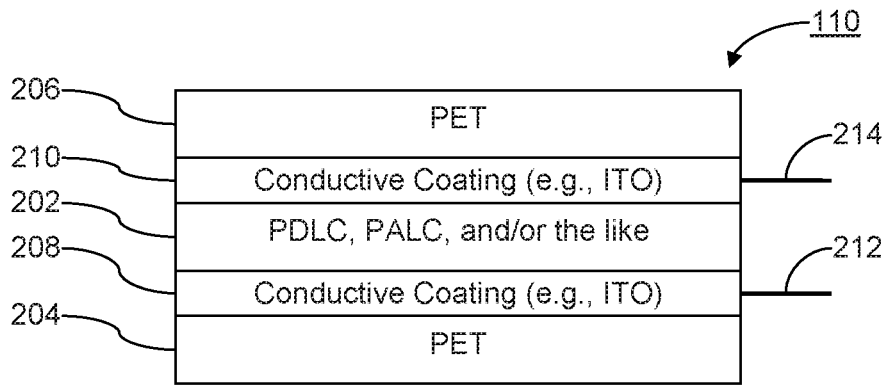
FIG. 2 is an enlarged cross-sectional view of the switchable layer stack shown in FIG. 1, in accordance with certain example embodiments.

FIG. 2 is an enlarged cross-sectional view of the switchable layer stack 110 shown in FIG. 1, in accordance with certain example embodiments. A polymer-based liquid-crystal inclusive material such as PDLC, PALC, and/or the like may be use as the functional layer 202. The functional switchable film 202 may be sandwiched between first and second carrier substrates 204 and 206 that also support first and second conductive coatings 208 and 210. The first and second conductive coatings 208 and 210 may be transparent conductive coatings (TCCs) such as transparent conductive oxides (TCOs) in certain example embodiments. It will be appreciated, however, that because the visible transmission characteristics of the sunroof application are not very demanding, better conductivity may be traded off for lower visibility in at least certain example embodiments. Suitable conductive coatings may include layers comprising indium tin oxide (ITO), tin oxide, indium gallium zinc oxide (IGZO), silver, and/or the like. First and second wire leads 212 and 214 may be provided in electrical connection with the first and second conductive coatings 208 and 210.

Figure 3:
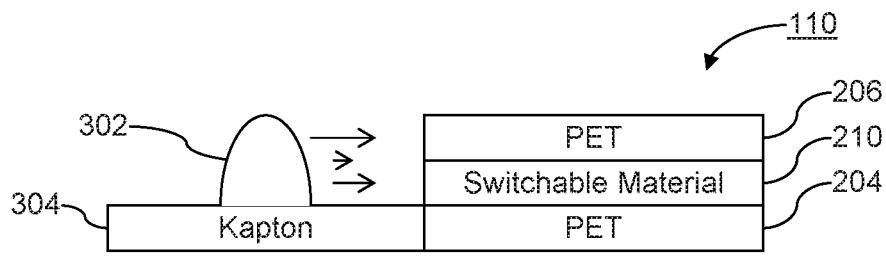
FIG. 3 is a cross-sectional view illustrating the operation of a side-firing light emitting diode (LED) in accordance with certain example embodiments.

FIG. 3 is a cross-sectional view illustrating the operation of a side-firing LED in accordance with certain example embodiments. As shown in FIG. 3, an LED 302 is provided outside the peripheral edge of the switchable layer stack 110. The LED 302 is supported by a substrate which, in the FIG. 3 example, is a Kapton substrate. It will be appreciated that the LEDs may be uniformly colored (e.g., red, green, blue) or differently colored. Similarly, tri-color and/or other LEDs may be used in certain example embodiments. A color rendering index (CRI) matching layer may be provided on a major surface of the first substrate 102, e.g., to help for differences in liquid crystal or other scatterer size and/or LED wavelength and thus help provide a desirable light coloration in the vehicle, to the extent that such cannot be tuned through LED color selection; scatterer size, shape, distribution; distance between the LEDs and the switchable film; etc.

Light from the LED 302 is emitted towards the switchable material 210, and the switchable material 210 in the switchable layer stack 110 may in certain example embodiments be used to collect and distribute the light from the LED 302 to the cabin. The LED 302 is spaced apart from the edge of the adjacent glass but is close to (and potentially in direct physical contact with) the switchable layer stack 110. The liquid crystal elements in the switchable layer stack 110 are sized and dispersed in the switchable material 210, in order to create the desired scattering effect and, thus, a desirable lighting effect. Further details regarding how the scattering is believed to operate are provided below.

With respect to spacing from the edge of the glass, in general, the LED's may be spaced 1-25 mm, more preferably 3-15 mm, and most preferably 5-10 mm from the edge of the glass. In general, position with respect to the edge of the glass can become a concern if it is less than about 5-10 mm (and more often about 10 mm), e.g., when it comes to certain lamination sealing operations. However, for many applications, spacing from the edge might not be a concern.

With respect to spacing from the edge of the switchable layer stack 110, in general, the LED's may be spaced no more than 5 mm, more preferably no more than 3 mm, and still more preferably no more than 1-2 mm, from the switchable layer stack 110. In certain example embodiments, the LEDs may be directly physically touching the switchable layer stack 110. It will be appreciated that the positioning may be adjusted based on the characteristics of the LEDs and/or the switchable material used. Certain example embodiments may include a further substrate interposed here, e.g., to directly or indirectly enhance the coupling of light from the LED into the PDLC or the like film.

In general, providing the LEDs too close to the edge of the glass and/or too far from the switchable layer stack 110 may allow too much light to avoid entering into the switchable material 210 and/or to leak out from the edges of the assembly. Pushing the LEDs too far away from the switchable material 210 may not allow enough light to enter into it which, in turn, may cause a drop-off in lighting towards the center of the sunroof, e.g., as less light is scattered to these regions because of the lower amount of light entering into the switchable material 210 in the first place. In general, in certain implementations, the ambient light entering into the vehicle will be brightest at the perimeter and fade towards the center of the switchable material 210, anyway.

Many side-firing LEDs rise to a maximum height of about 0.3 mm above the substrates on which they are mounted. Considering typical thickness required from a PDLC material that may be used in the switchable material 210 and the minimal thickness increases provided by the first and second conductive coatings 208 and 210, the height of each of the PET carriers 204 and 206 can be optimized to yield certain processing and/or performance advantages. For example, the LED substrate 304 thickness may be selected to be the same approximate thickness as the first PET carrier substrate 204, e.g., such that the very top of the LED 302 is substantially even with the top of the second PET carrier substrate 206. This is advantageous in terms of the light capturing and redirecting abilities of the switchable layer stack 110, as well as the manufacturing of the stack from the standpoint of the laminating layers (e.g., PVB interlayers 112 and 114) being easily positioned and being able to readily laminate together the substrates without significant thickness variations caused by major differences in thickness between the PDLC and the LEDs.

Figure 4:
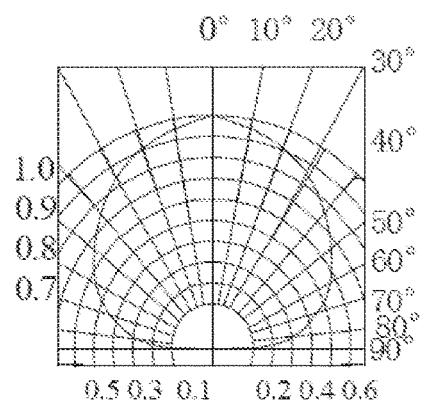
FIG. 4 is a diagram showing the intensity fall-off of the emitted light from a typical side-firing LED as a function of angle from the normal axis of the LED emitter surface.

The FIG. 4 diagram shows the intensity fall-off of the emitted light from a typical side-firing LEI) as a function of angle from the normal axis of the LED emitter surface. It can be seen that at 90 degrees from the normal axis, the intensity of the light from the example LED is essentially zero. However, certain example embodiments enable this diagram to in essence be turned substantially 90 degrees, such that the light from a side-firing LED can be redirected into a top-firing LED. Furthermore, it can be seen in certain example embodiments that the intensity distribution of the light would be less of a point as seen in the diagram and more of a flat top, thereby implying less glare in a single direction.

Common experience suggests that the light produced from an LED, when looked at directly, is very intense. Therefore, although LEDs have many advantages over other sources of light (e.g., in terms of power efficiency, lifetime, color selection, size, weight, etc.), LEDs by themselves generally are not thought of for use in soft or ambient lighting applications. Thus, there would be a natural bias against using LEDs in the interior of a vehicle (e.g., in connection with a dome light), unless substantial additional optical elements were provided (e.g., to diffuse or otherwise soften the light). Yet certain example embodiments enable side-firing LEDs to be used for ambient lighting by coupling the light into a non-absorbing or slightly absorbing element with dispersive properties such as that found in PDLC films. Complex optical elements may be provided but are not necessary in certain example embodiments.

Figure 5:
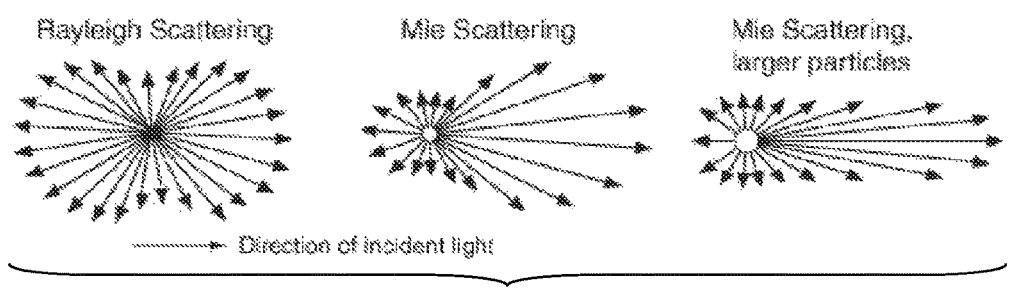
FIG. 5 shows different types of light scattering effects.

FIG. 5 shows different types of light scattering effects, and the following discussion is provided as background in understanding why PDLC films or the like are particularly suited for dispersing LED light. Diffusion of light is a scattering phenomena, e.g., where the individual scattering events are in essence sufficiently random and dense to be "averaged out" into the commonly used terms of diffusion or dispersion. Optical scattering can be further classified as being either elastic or inelastic. Inelastic scattering, such as absorption or Brillion scattering, is a decay phenomenon in that some energy is lost. In the ideal situation, elastic scattering does not involve the loss of energy and is preferred in the lighting scenarios contemplated herein.

Elastic scattering includes Rayleigh and Mie scattering, both of which are subject to Maxwell's equations. However, they are qualitatively different and differentiated, for example, by the size of the particles that do the scattering. Rayleigh scattering is caused by the interaction of light with tiny particles that are much smaller than the wavelengths of light impinging on them. Rayleigh scattering in the ideal case is symmetric in that scattering occurs equally in the forward and backward directions. It is also very strongly dependent on the wavelength. When the particles are as large as (or larger than) the wavelength of light they are interacting with, Mie scattering is said to occur. Mie scattering in the ideal case is wavelength independent and occurs in the forward direction. Rayleigh scattering is why the sky appears blue, and Mie scattering is why clouds appear white. If cloud particles were smaller, and thus subject to Rayleigh scattering, the clouds would appear blue.

With respect to the technology described herein, if the liquid crystal (LC) particles in the PDLC were small enough to act as Rayleigh scatterers, the light from an LED would not transmit in the forward direction because it would be scattered as much backwards as forwards. Furthermore, the light would be wavelength shifted because Rayleigh scattering is highly dependent on wavelength. For instance, red LED light would look yellower when scattered by Rayleigh scatterers, yellow LED light would look bluer, blue LED light would shift towards ultra violet, etc. The LC in a PDLC film or the like according to certain example embodiments has a mean diameter that is about the same size as the wavelength of light, namely, about 0.5 microns. This implies that in the main the scattered light moves away from the source of light (and thus is transmitted), and the light does not wavelength shift. These properties are desirable for the example applications described herein. It will be appreciated that if the LC droplets were smaller, they would not work well (or potentially at all) as scatterers because they would not transmit in the forward direction. Similarly, if they were much bigger they would not work well (or potentially at all) as scatterers because they would absorb more and thus transmit less light. In certain example embodiments, the LCs in the PDLC or other film have a mean diameter of 380-760 nm, more preferably 475-665 nm, and still more preferably 500-600 nm, assuming that the LED emits generally white light. Although certain example embodiments are described in connection with switchable films, other scattering media that is not switchable may be used in different example embodiments in place of, or in addition to, the switchable (e.g., PDLC, PALC, etc.) films discussed herein.

With these guiding principles, it becomes possible to appreciate that the performance of the lighting features may be improved or optimized by considering a variety of factors including, for example, the spacing between the LEDs and the edge of the switchable film, the density of LEDs around the periphery of the sunroof (e.g., to achieve a sufficiently uniform illumination), whether to including light coupling agents between the LEDs and the switchable film (e.g., to improve the efficiency of the light exiting from the LEDs and entering into the switchable film), the simultaneous coupling of differently colored LEDs, the use of both top-firing and side-firing LEDs (e.g., to allow for both direct and ambient lighting), etc.

Out-coupling efficiency may improved by providing an optical out-coupling layer stack (OCLS) or the like. See, for example, U.S. application Ser. No. 13/826,495, filed on Mar. 14, 2013, the entire contents of which are hereby incorporated by reference herein. An OCLS layer may be provided, for example, between the substrate 102 and the switchable layer stack 110. In certain examples, such an OCLS layer increased light out-coupling 30-40%.

Although FIG. 3 shows only one LED, it will be appreciated that the LEDs may be provided in a densely packed string of LEDs. The spacing between adjacents LEDs in the string may be less than or equal to about 1 inch, preferably less than or equal to 0.75 inch, more preferably less than or equal to 0.5 inch, and still more preferably less than or equal to 0.25 inch. The spacing may be determined in part based on how much ambient light is desired, whether lenses or other optical elements are provided (e.g., to increase in-coupling effeciency with respect to the switchable film), etc.

Figure 6:
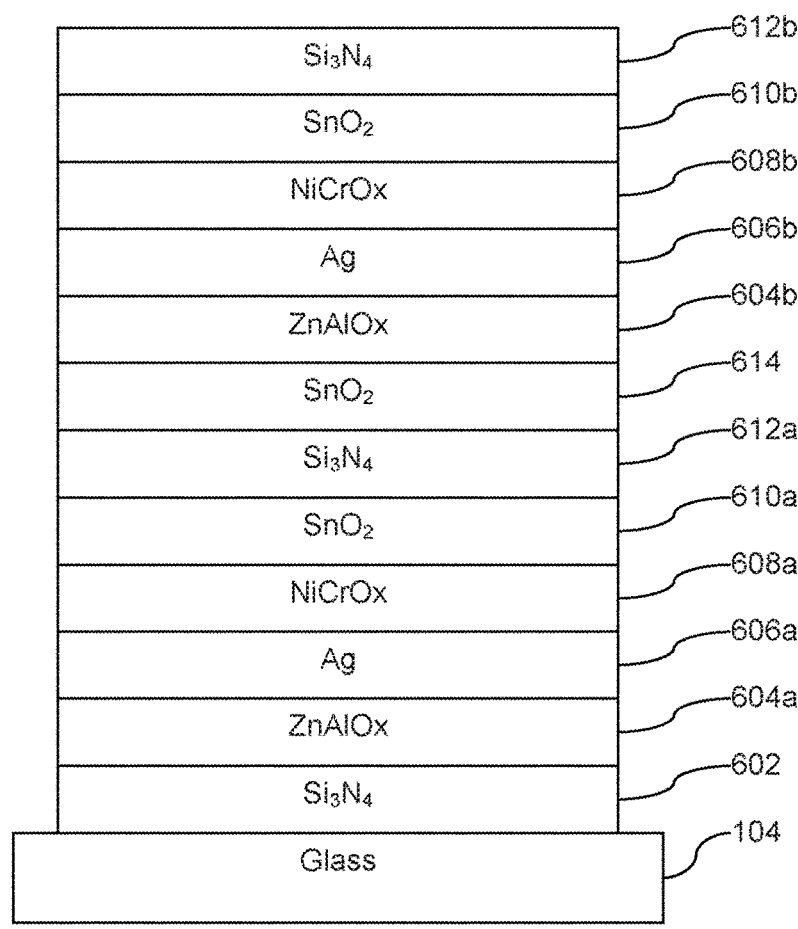
FIG. 6 is an example low-emissivity coating that may be used in connection with certain example embodiments.

Referring once again to the drawings, FIG. 6 is an example low-E coating that may be used in connection with certain example embodiments. The FIG. 6 example low-E coating may be provided on the second surface of the sunroof in certain example embodiments. A first silicon-inclusive layer is provided directly on and contacting the second substrate 104. This first silicon-inclusive layer may be an oxide and/or nitride, and it may help block sodium migration from the glass (e.g., during heat treatment) in certain example embodiments. A first layer comprising zinc aluminum oxide 604a is provided below the first layer comprising silver 606a. The first layer comprising zinc aluminum oxide 604a helps provide a smooth layer for the silver to grow on and also helps with the optical properties of the coating (e.g., by providing good coloration). A first layer comprising Ni, Cr, and/or Ti 608a, and/or an oxide thereof, (e.g., NiCrOx), is provided over the first layer comprising silver 606a and may help to protect the Ag, e.g., during heat treatment and/or the like. A first layer comprising tin oxide 610a is provided thereon. The FIG. 6 embodiment may be thought of as include a thick layer comprising tin oxide split by a second silicon-inclusive layer 612a. "Breaking" the thick layer comprising tin oxide into first and second layers comprising tin oxide 610a and 614 with the second silicon-inclusive layer may help with the overall optics of the stack. Alternatively, the FIG. 6 embodiment may be thought of as providing a protective overcoat including first layer comprising Ni, Cr, and/or Ti 608a, the first layer comprising tin oxide 610a, and the second silicon-inclusive layer 612a. In any event, portions of the lower Ag-inclusive layer stack repeat, e.g., such that a second layer comprising zinc aluminum oxide 604b is provided below the second layer comprising silver 606b, and layers comprising Ni, Cr, and/or Ti 608b, tin oxide 610b, and silicon nitride 612b are provided above the second Ag-inclusive layer 606b. In the FIG. 6 example, each silicon-inclusive layer comprises silicon nitride and each layer comprising Ni, Cr, and/or Ti includes NiCrOx. It will be appreciated, however, that the same or different materials may be used for the various layers in different example embodiments.

The FIG. 6 example low-E coating may be heat treated (e.g., heat strengthened and/or thermally tempered) in certain example embodiments. Example thicknesses for certain heat treatable embodiments are provided in the table below:

| | Heat Treatable Examples | | |
|---|---|---|---|
| Layer | Preferred Thickness (Å) | More Preferred Thickness (Å) | Example Thickness (nm) |
| Glass | N/A | N/A | N/A |
| $Si_3N_4$ | 145-225 | 165-205 | 19 |
| ZnAlOx | 85-130 | 95-118 | 11 |
| Ag | 60-95 | 68-87 | 8 |
| NiCrOx | 24-40 | 27-37 | 3 |
| $SnO_2$ | 328-495 | 370-455 | 41 |
| $Si_3N_4$ | 104-158 | 115-145 | 13 |
| $SnO_2$ | 85-130 | 97-120 | 11 |
| ZnAlOx | 95-143 | 105-132 | 12 |
| Ag | 60-95 | 68-87 | 7.5 |
| NiCrOx | 24-40 | 27-37 | 3 |
| $SnO_2$ | 269-405 | 303-372 | 34 |
| $Si_3N_4$ | 60-90 | 65-85 | 7.5 |

The same basic layer stack may be used for a non-heat treatable example embodiment. For instance, it may be possible to adjust the silver layer thickness and/or the thicknesses of the layers adjacent the silver layers. With regard to the former, the lower silver-inclusive layer preferably is 85-130 Å thick, and more preferably 96-118 Å thick, with an example thickness of 11 nm; and the upper silver-inclusive layer preferably is 82-124 Å thick, and more preferably 92-114 Å thick, with an example thickness of 10 nm.

Other variations are possible. For example, a layer comprising titanium oxide (e.g., $TiO_2$ or other suitable stoichiometry) may be provided below the first silicon-inclusive layer; the layer comprising ZnAlOx can be preplaced with a layer comprising a layer comprising Ni, Cr, and/or Ti, and/or an oxide thereof (e.g., NiCrOx); the sub-stack comprising layers including $SnO_2$ and ZnAlOx can be replaced with a layer comprising Ni, Cr, and/or Ti, and/or an oxide thereof (e.g., NiCrOx); etc.

The FIG. 6 example embodiment is a double-silver layer stack in the sense that it include first and second layers comprising Ag 606a and 606b. It will be appreciated that single-silver, triple-silver, quad-silver, and/or other layer stacks may be provided in different example embodiments. It also will be appreciated that this may be accomplished by providing more or fewer ZnAlOx/Ag/NicrOx/SnO2 stacks. In cases where there are more of these stacks are provided, they may be interrupted by silicon-inclusive layers, layers comprising titanium oxide and/or niobium oxide, etc., e.g., to achieve desired optical properties. Thickness ranges, indices of refraction, and/or the like, may be tuned in these respects.

To provide enhanced UV blocking features (e.g., blockage of light having a wavelength in the range of about 380-400 nm), additional layers may be added to the low-E coating. For example, a dielectric layer (e.g., any one or more of the layers comprising tin oxide in the example above) may be "split" and an additional UV blocking layer may be added (e.g., between successive layers of the split dielectric layer). The UV blocking layer may be of or include zinc oxide doped with bismuth (e.g., ZriBiO or other suitable stoichiometry) or simply bismuth oxide (BiO) in certain example embodiments. In certain other example embodiments, the UV blocking layer may include silver oxide (e.g., $AgO_x$ or other suitable stoichiometry), as described, for example, in U.S. Pat. No. 6,596,399, the entire content of which is hereby incorporated herein by reference.

As will be appreciated from the above, the low-E coating may be a multi-layer low-E coating including at least one infrared (IR) reflecting layer. The IR reflecting layer may comprise silver, and it may be sandwiched between one or more dielectric layers. The low-E coating may be any suitable low-E coating including, for example, any of the low-E coatings described and/or illustrated in any of U.S. Pat. No. 2009/0115922, 7,998,320, 7,771,830, 7,198,851, 7,189,458, 7,056,588, or 6,887,575, the entire contents of each of which are all hereby incorporated herein by reference.

The low-E and/or UV-blocking features of certain example embodiments may help protect the switchable film, circuits, and/or the like, e.g., from increased heating caused by exposure to the sun, etc.

Figure 7:
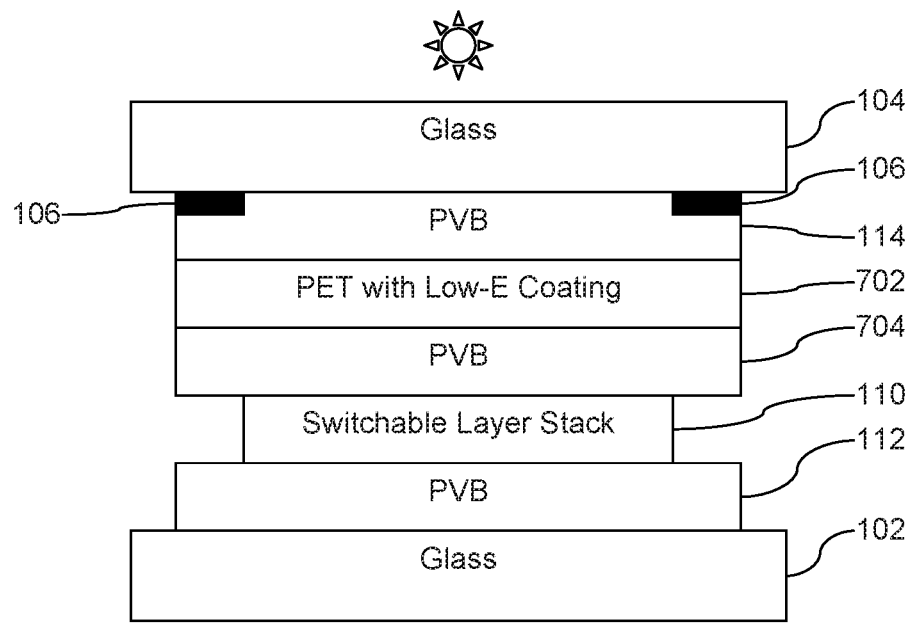
FIG. 7 is another partial cross-sectional view of a sunroof in accordance with certain example embodiments.

As alluded to above, it may be desirable to use black frit or paint on the second surface of the sunroof, e.g., to help hide electrical connections, electronic components, and/or the like. It is noted, however, that it sometimes is difficult to apply frit or paint over a low-E coating or the like. FIG. 7 is a variation on the FIG. 1 example that helps address this issue. As can be seen from FIG. 7, black fit or paint 106 is provided on the second surface. However, a low-E coating is not directly provided thereon. Instead, a low-E PET layer 702 is provided between the second substrate 104 and the switchable layer stack 110. In order to help secure the low-E PET layer 702 to the switchable layer stack 110 and laminate the entire assembly together, an optional additional laminating layer 704 is provided therebetween. It is noted that in certain example embodiments the low-E PET layer 702 may be adhered more directly to the second glass substrate 104, potentially removing the need for the PVB layer 114. A split silver XIR 70 low-E coating available from Eastman Chemicals, a XIR 70 HPS low-E coating from Eastman Chemicals, and/or the like, may be used in this regard. It will be appreciated that modifications to the coloration of the low-E stack, the substrate, etc., may be desirable, e.g., because providing a black material over low-E sometimes yields an undesirable or inconsistent coloration.

Figure 8:
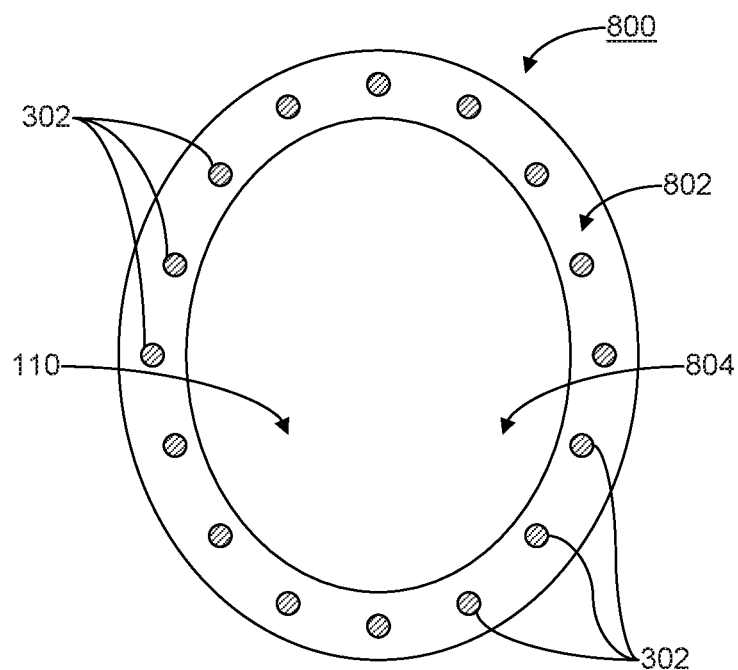
FIG. 8 is a plan view of a sunroof according to certain example embodiments.

FIG. 8 is a plan view of a sunroof 800 according to certain example embodiments. Side-firing LEDs 302 are provided around the non-lighted periphery 802 of the sunroof 800 in FIG. 7. As will be appreciated from the discussion above, the periphery 802 may have black frit or paint applied thereto, e.g., to help conceal the circuitry, etc. In the FIG. 8 example, the switchable layer stack 110 is spaced apart from the LEDs 302 and, from a plan view perspective, within that outer ring of LEDs 302. The side-firing LEDs 302 contact the switchable layer stack 110, and inner area 804 is illuminated. Thus, a substantial portion of the FIG. 7 example sunroof is seen as "glowing" from the diffusion of light from the LEDs 302 through the switchable layer stack 110 and into to cabin (e.g., even though there might be an intensity fall-off). It will be appreciated that if the side-firing LEDs 302 were used without the presence of the switchable layer stack 110, the highly collimated point source nature of the LEDs 302 would in essence cause the emitted light to go "straight through" the thickness of the sunroof from one side to the other. However, by providing PDLC or the like inside of the LEDs 302, the PDLC or the like acts as a waveguide or diffuser for creating the ambient light in the vehicle cabin.

Figure 9:
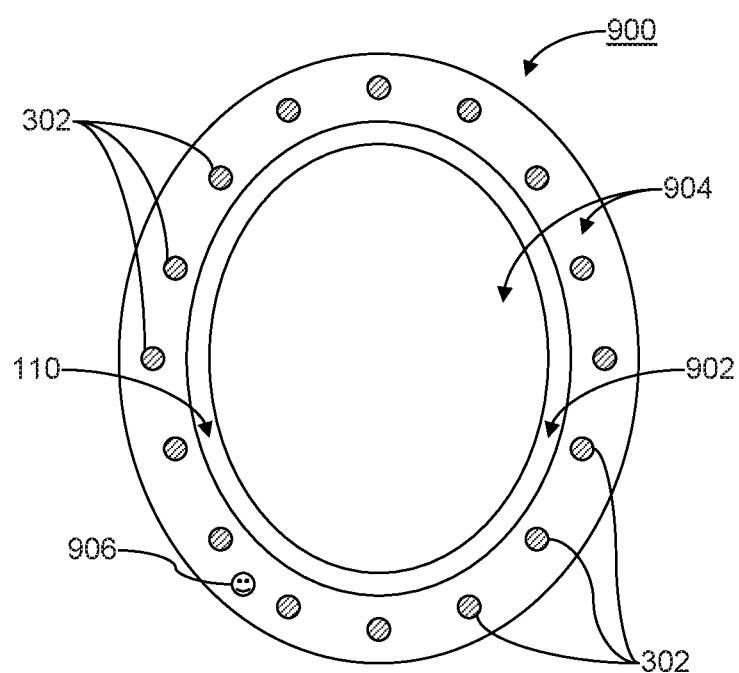
FIG. 9 is a plan view of an article according to certain example embodiments.

FIG. 9 is a plan view of an article 900 according to certain example embodiments. FIG. 9 is similar to FIG. 8, except that the switchable layer stack 110 is not provided across substantially the entirety of the article. It instead is provided along a narrow band interior to the LEDs 302. This configuration results in a more uniform, more narrow glowing perimeter 902 inside the cabin, with inner and outer non-lighted areas 904. However, because the interior of the article 900 is not switchable, the article might be used in other window applications. In this regard, the LEDs and/or switchable layer stack 110 may be provided in any shape, pattern, or general configuration, and the racetrack configuration is provided by way of contrast with the FIG. 8 example embodiment. The FIG. 9 article may, however, be used as a sunroof if a privacy shade were used, or the like.

As indicated above, black frit or paint may be applied to the outer peripheral area. A portion of it may, however, be removed proximate decorative image 906 (e.g., via laser etching, mechanical means, and/or the like). A downward-facing LED could be provided proximate to the decorative image 906 to backlight the image and create, for example, a bright logo or the like. As will be appreciated from the above, artistic images, informational indicators, and/or the like may be illuminated in this way.

The substrates described herein may be heat treated (e.g., heat strengthened and/or thermally tempered), and/or chemically tempered, in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Although FIGS. 8-9 show substantially ovular articles with substantially ovular inner illuminated areas, it will be appreciated that the example techniques disclosed herein may be used in connection with different arrangements. For instance, the articles may vary in size and/or shape, and the size and/or shape of the illuminated areas therein may vary as well, e.g., so that they are the same or different shape. Moreover, certain example embodiments may include multiple discrete lightable zones (e.g., by creating separately activatable LEDs, etc.).

In certain example embodiments, the LEDs and/or the switchable film may be used independently of one another. For example, the LEDs may be activated when interior lighting is desired, whereas the switchable film may be activated when it is desirable to see through the sunroof, etc. In this regard, interior lighting may be provided by turning on the LEDs and turning off the switchable film (e.g., assuming that the off state of the switchable film creates the desired scattering effects). In a related regard; the side-firing LEDs may be activated independently of some or all downward facing LEDs used for symbol illumination or the like. Different colored lights may be used for different symbols and/or the dome light replacement. For instance, a more whitish light may be used for dome light replacement; gauge indicators may be blue, amber, white, etc.; logos may match "company colors" or the like; alert, warning, and/or other symbols may be green, yellow, orange, red, and/or the like based on severity; etc.

Methods of making the above-described and/or other sunroofs, windows, etc., also are contemplated herein. For example, in certain example embodiments a method of making a window comprises: positioning a plurality of side-firing light emitting diodes (LEDs) around a periphery of a first glass substrate, the LEDs being configured to emit light towards central regions of the window; providing a liquid-crystal inclusive switchable film, the liquid crystals of the liquid-crystal inclusive switchable film being sized such that light received from the LEDs is redirected in a direction substantially normal to major surfaces of the first and second substrates; and laminating together the first substrate and a second glass substrate with the LEDs and the liquid-crystal inclusive switchable film therebetween such that the first and second substrates are substantially parallel to one another. The switchable film and the LEDs are made to be operable independently of one another in connection with the LEDs emitting light and the switchable film controlling visible transmission therethrough, and the switchable film is made to be operable in at least first and second modes, the window in the first mode having a visible transmission of less than 1%, the window in the second mode having a visible transmission of 7-15%.

Certain example embodiments exhibit an interesting aesthetic effect in that the sunroofs may appear to glow if the vehicle is parked underneath a light pole or the like in the evening and when there is light coming from the pole.

Certain example embodiments have been described in connection with glass substrates. However, alternative substrate materials may be used in place of one or more of the glass substrates. For instance, plastics and/or the like may be suitable in certain example embodiments.

Although certain example embodiments have been described in connection with sunroofs for certain automotive applications, it will be appreciated that the techniques disclosed herein may find applicability to a wide range of products. For instance, the example techniques disclosed herein may be used in connection with sunroofs in cars, trucks, boats, tractor cabs, and/or the like. Similarly, the example techniques set forth herein may be used in other vehicle glass applications such as, for example, side window, interior partition, rear window, and/or other type applications. The example techniques disclosed herein also may be used in connection with skylights and/or other types of windows, doors, etc., where variable transmission and/or selective illumination from a diffuse light source is desirable. Thus, the example techniques described herein may be used in connection with any type of window or glazing product in different example embodiments. Furthermore, in certain example embodiments, the use of side-firing LEDs coupling light into PDLC films or the like may have application in the area of appliances such as refrigerators, wine coolers, washers/dryers, stovetops, etc.

Different target applications may include different first and second mode target transmission values. For instance, although the example transmission values provided above are desirable for at least some sunroof type applications, other applications may include different first and/or second mode transmissions values. Side windows in a car, for instance, may have much higher first and/or second mode transmission values, e.g., to conform to maximum tinting requirements or regulations and/or minimum transmission requirements. In general, however, the transmission associated with the first mode will be lower than the transmission of the second mode, e.g., in accordance with normal switchable glazing operations.

Although certain example embodiments have been described in connection with redirecting light in a direction normal, perpendicular, 90 degrees, or otherwise in relation to, a reference, or substantially in such a relation, it will be appreciated that certain example embodiments may allow for some spread of the light, e.g., suitable for creating the diffuse, softer, ambient light indicated as being desirable in certain example embodiments. In general, a major portion of the light will be emitted into the cabin at a direction less than the critical angle of the material (possible glass) adjacent the cabin. Thus, a major portion (if not all or substantially all) of the light in certain example embodiments preferably will be no more than 37 degrees from normal, more preferably no more than 30 degrees from normal, and still more preferably no more than 15-20 degrees from normal from this surface.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a sunroof for a vehicle is provided. First and second glass substrates are substantially parallel to one another. LEDs are provided between the first and second substrates and are configured to emit light towards central regions of the sunroof. A light scattering layer is provided between the first and second substrates, with the light scattering layer having light scatterers disposed therein, and with the light scatterers being sized and arranged in the light scattering layer and relative to the LEDs such that light received from the LEDs is redirected in a direction substantially normal to major surfaces of the first and second substrates.

In addition to the features of the previous paragraph, in certain example embodiments, the light scattering layer may be a liquid-crystal inclusive switchable film and the scatterers may be liquid crystals.

In addition to the features of the previous paragraph, in certain example embodiments, the liquid crystals may have a mean diameter of about 0.5 microns.

In addition to the features of any of the three previous paragraphs, in certain example embodiments, the switchable film may comprise a polymer-dispersed liquid crystal (PDLC) film.

In addition to the features of any of the four previous paragraphs, in certain example embodiments, the switchable film may be operable in at least first and second modes, e.g., with the sunroof in the first mode potentially having a visible transmission of less than 1%, and with the sunroof in the second mode potentially having a visible transmission of 7-15%.

In addition to the features of any of the five previous paragraphs, in certain example embodiments, the switchable film may be sandwiched between first and second conductive coatings and first and second carrier substrates.

In addition to the features of the previous paragraph, in certain example embodiments, the LEDs may be mounted on at least one substrate; bottom surfaces of the at least one substrate and the first carrier substrate may be substantially even with one another when viewed in cross-section; and top surfaces of the LEDs and the second carrier substrate may be substantially even with one another when viewed in cross-section.

In addition to the features of any of the seven previous paragraphs, in certain example embodiments, the LEDs may be side-firing LEDs, optionally spaced no more than 1-2 mm from adjacent edges of the light scattering layer.

In addition to the features of any of the eight previous paragraphs, in certain example embodiments, the switchable film and the LEDs may be operable independently of one another in connection with the LEDs emitting light and the switchable film controlling visible transmission therethrough.

In addition to the features of any of the nine previous paragraphs, in certain example embodiments, black paint or fit material may be disposed, directly or indirectly, on the first and/or substrates, e.g., proximate to the LEDs and/or control circuitry thereof.

In addition to the features of the previous paragraph, in certain example embodiments, at least a portion of the black paint or frit material may be removed to create a symbol, optionally with the symbol being back-lightable by diffuse light from one or more of the LEDs and/or direct light from a downward-facing LED.

In addition to the features of any of the 11 previous paragraphs, in certain example embodiments, the light scattering layer may extend across substantially the entirety of the sunroof.

In certain example embodiments, a window is provided. First and second glass substrates are substantially parallel to one another, LEDs are provided between the first and second substrates and are configured to emit light towards a center of the window. A light scattering layer is provided between the first and second substrates, with the light scattering layer having light scatterers disposed therein, and with the light scatterers being sized and positioned relative to at least the LEDs such that light received from the LEDs is redirected in a direction substantially normal major surfaces of the first and second substrates.

In addition to the features of the previous paragraph, in certain example embodiments, first and second laminating interlayers are respectively provided between the first substrate and the light scattering layer, and between the second substrate and the light scattering layer.

In addition to the features of either of the two previous paragraphs, in certain example embodiments, the light scattering layer may be a liquid-crystal inclusive switchable film and the scatterers may be liquid crystals.

In addition to the features of the previous paragraph, in certain example embodiments, the liquid crystals may have a mean diameter of 475-665 nm.

In addition to the features of any of the four previous paragraphs, in certain example embodiments, the switchable film may be operable in at least first and second modes, with the window in the first mode optionally having a visible transmission of less than 1%, and with the window in the second mode optionally having a visible transmission of 7-15%.

In addition to the features of any of the five previous paragraphs, in certain example embodiments, the switchable film may be sandwiched between first and second conductive coatings and first and second carrier substrates; the LEDs may be mounted on at least one substrate; bottom surfaces of the at least one substrate and the first carrier substrate may be substantially even with one another when viewed in cross-section; and top surfaces of the LEDs and the second carrier substrate may be substantially even with one another when viewed in cross-section.

In addition to the features of any of the six previous paragraphs, in certain example embodiments, the LEDs may be side-firing LEDs, and light received from the LEDs may be redirected in a direction substantially normal to the direction in which the light is emitted from the LEDs.

In addition to the features of any of the seven previous paragraphs, in certain example embodiments, the switchable film and the LEDs may be operable independently of one another in connection with the LEDs emitting light and the switchable film controlling visible transmission therethrough.

In addition to the features of any of the eight previous paragraphs, in certain example embodiments, the LEDs may directly physically contact peripheral edges of the light scattering layer.

In addition to the features of any of the nine previous paragraphs, in certain example embodiments, black paint or fit material may be disposed, directly or indirectly, on the first and/or substrates, e.g., proximate to the LEDs and/or control circuitry thereof.

In addition to the features of the previous paragraph, in certain example embodiments, at least a portion of the black paint or fit material may be removed, e.g., to create a symbol.

In addition to the features of any of the 11 previous paragraphs, in certain example embodiments, the symbol may be back-lightable by diffuse light from one or more of the LEDs.

In addition to the features of any of the 12 previous paragraphs, in certain example embodiments, the symbol may be back-lightable by direct light, e.g., from a downward-facing LED.

In certain example embodiments, a window is provided. First and second glass substrates are substantially parallel to one another. Side-firing LEDs are provided between the first and second substrates and are configured to emit light towards central regions of the window. A liquid-crystal inclusive switchable film is provided between the first and second substrates; with the liquid crystals of the liquid-crystal inclusive switchable film being sized such that light received from the LEDs is redirected in a direction substantially normal to major surfaces of the first and second substrates. The switchable film is operable in at least first and second modes, with the window in the first mode having a visible transmission of less than 1%, and with the window in the second mode having a visible transmission of 7-15%. The switchable film and the LEDs are operable independently of one another in connection with the LEDs emitting light and the switchable film controlling visible transmission therethrough.

In addition to the features of the previous paragraph, in certain example embodiments, the liquid crystals may have a mean diameter of 475-665 nm and/or the LEDs may be spaced no more than 5-10 mm apart from the nearest peripheral edges of the light scattering layer.

In addition to the features of either of the two previous paragraphs, in certain example embodiments; the switchable film may be sandwiched between first and second conductive coatings and first and second carrier substrates; the LEDs may be mounted on at least one substrate; bottom surfaces of the at least one substrate and the first carrier substrate may be substantially even with one another when viewed in cross-section; and top surfaces of the LEDs and the second carrier substrate may be substantially even with one another when viewed in cross-section.

In addition to the features of any of the three previous paragraphs, in certain example embodiments, black paint or frit material may be disposed, directly or indirectly, on the first and/or substrates proximate to the LEDs and/or control circuitry thereof, and at least a portion of the black paint or frit material may be removed to create a symbol or the like, with the symbol optionally being back-lightable by diffuse light from one or more of the LEDs and/or by direct light from a downward-facing LED.

In certain example embodiments a method of making a window comprises: positioning a plurality of side-firing light emitting diodes (LEDs) around a periphery of a first glass substrate, the LEDs being configured to emit light towards central regions of the window; providing a liquid-crystal inclusive switchable film; the liquid crystals of the liquid-crystal inclusive switchable film being sized such that light received from the LEDs is redirected in a direction substantially normal to major surfaces of the first and second substrates; and laminating together the first substrate and a second glass substrate with the LEDs and the liquid-crystal inclusive switchable film therebetween such that the first and second substrates are substantially parallel to one another. The switchable film and the LEDs are made to be operable independently of one another in connection with the LEDs emitting light and the switchable film controlling visible transmission therethrough, and the switchable film is made to be operable in at least first and second modes, the window in the first mode having a visible transmission of less than 1%, the window in the second mode having a visible transmission of 7-15%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a window, the method comprising:
    positioning a plurality of side-firing light emitting diodes (LEDs) around a periphery of a first glass substrate, the LEDs being configured to emit light towards central regions of the window;
    providing a liquid-crystal inclusive switchable film, the liquid crystals of the liquid-crystal inclusive switchable film being sized such that light received from the LEDs is redirected in a direction substantially normal to major surfaces of the first and second substrates; and
    laminating together the first substrate and a second glass substrate with the LEDs and the liquid-crystal inclusive switchable film therebetween such that the first and second substrates are substantially parallel to one another, wherein:
    the switchable film and the LEDs are operable independently of one another in connection with the LEDs emitting light and the switchable film controlling visible transmission therethrough, and
    the switchable film is operable in at least first and second modes, the window in the first mode having a visible transmission of less than 1%, the window in the second mode having a visible transmission of 7-15%.

* * * * *